(12) United States Patent
Smyth et al.

(10) Patent No.: US 10,903,870 B1
(45) Date of Patent: Jan. 26, 2021

(54) ANGLE OF PROPAGATION ESTIMATION IN A MULTIPATH COMMUNICATION SYSTEM

(71) Applicant: Cypress Semiconductor Corporation, San Jose, CA (US)

(72) Inventors: Aidan Smyth, Milpitas, CA (US); Kiran Uln, Pleasanton, CA (US); Victor Simileysky, San Jose, CA (US); Kamesh Medapalli, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/585,400

(22) Filed: Sep. 27, 2019

Related U.S. Application Data

(60) Provisional application No. 62/874,079, filed on Jul. 15, 2019.

(51) Int. Cl.

| | |
|---|---|
| *H04L 25/02* | (2006.01) |
| *H04B 1/7113* | (2011.01) |
| *H04B 7/0456* | (2017.01) |
| *G01S 5/02* | (2010.01) |
| *H04B 7/06* | (2006.01) |
| *G06N 3/04* | (2006.01) |
| *H04B 1/712* | (2011.01) |
| *G06N 3/063* | (2006.01) |

(52) U.S. Cl.
CPC .......... *H04B 1/7113* (2013.01); *G01S 5/0257* (2013.01); *G06N 3/0445* (2013.01); *G06N 3/0635* (2013.01); *H04B 1/712* (2013.01); *H04B 7/0478* (2013.01); *H04B 7/0617* (2013.01); *H04L 25/0204* (2013.01)

(58) Field of Classification Search
CPC .... H04B 1/7113; H04B 1/712; H04B 7/0617; H04B 7/0478; H04L 25/0204; G06N 3/0635; G06N 3/0445; G01S 5/0257
See application file for complete search history.

(56) References Cited

U.S. PATENT DOCUMENTS

| | | | |
|---|---|---|---|
| 5,768,477 | A | 6/1998 | Johnson et al. |
| 7,969,910 | B2 | 6/2011 | Barak et al. |
| 9,689,983 | B2 | 6/2017 | Cao et al. |
| 10,257,765 | B2 | 4/2019 | Agee et al. |

(Continued)

FOREIGN PATENT DOCUMENTS

WO 2018128351 A1 7/2018

OTHER PUBLICATIONS

Sauli Lehtimaki, "Understanding Advanced Bluetooth Angle Estimation Techniques for Real-Time Locationing" Embedded World 2008, 18 pages.

(Continued)

*Primary Examiner* — Dac V Ha

(57) ABSTRACT

A system includes a transceiver configured to receive frequency dependent channel estimates or beamforming feedback in a multi-carrier, multi-antenna communication system, and a multi-layer perceptron feed forward neural network component, coupled with the transceiver, configured to estimate parameters of multipath reflections using representations of the channel estimates or beamforming feedback, and to generate transmission correction factors for the transceiver.

30 Claims, 12 Drawing Sheets

(56) References Cited

U.S. PATENT DOCUMENTS

| | | | |
|---|---|---|---|
| 2004/0029619 A1* | 2/2004 | Liang | H04B 7/0604 |
| | | | 455/562.1 |
| 2017/0195893 A1* | 7/2017 | Lee | H04L 5/006 |
| 2017/0215087 A1 | 7/2017 | Amizur et al. | |
| 2017/0331670 A1 | 11/2017 | Parkvall et al. | |
| 2017/0371022 A1 | 12/2017 | May | |
| 2018/0084105 A1 | 3/2018 | Hiscock et al. | |
| 2018/0248596 A1* | 8/2018 | Xiao | H04B 7/0456 |
| 2019/0164567 A1 | 5/2019 | Liu | |
| 2019/0182627 A1 | 6/2019 | Thoresen et al. | |
| 2019/0182665 A1 | 6/2019 | Edge | |
| 2019/0208317 A1 | 7/2019 | Woodruff et al. | |
| 2019/0219660 A1 | 7/2019 | Maruri et al. | |
| 2019/0319689 A1* | 10/2019 | Wu | H04L 5/0092 |
| 2020/0106505 A1* | 4/2020 | Nammi | H04W 72/1273 |

OTHER PUBLICATIONS

International Search Report for International Application No. PCT/US2020/037160 dated Jul. 1, 2020; 2 pages.

Written Opinion of the International Searching Authority for International Application No. PCT/US2020/037160 dated Jul. 1, 2020; 5 pages.

* cited by examiner

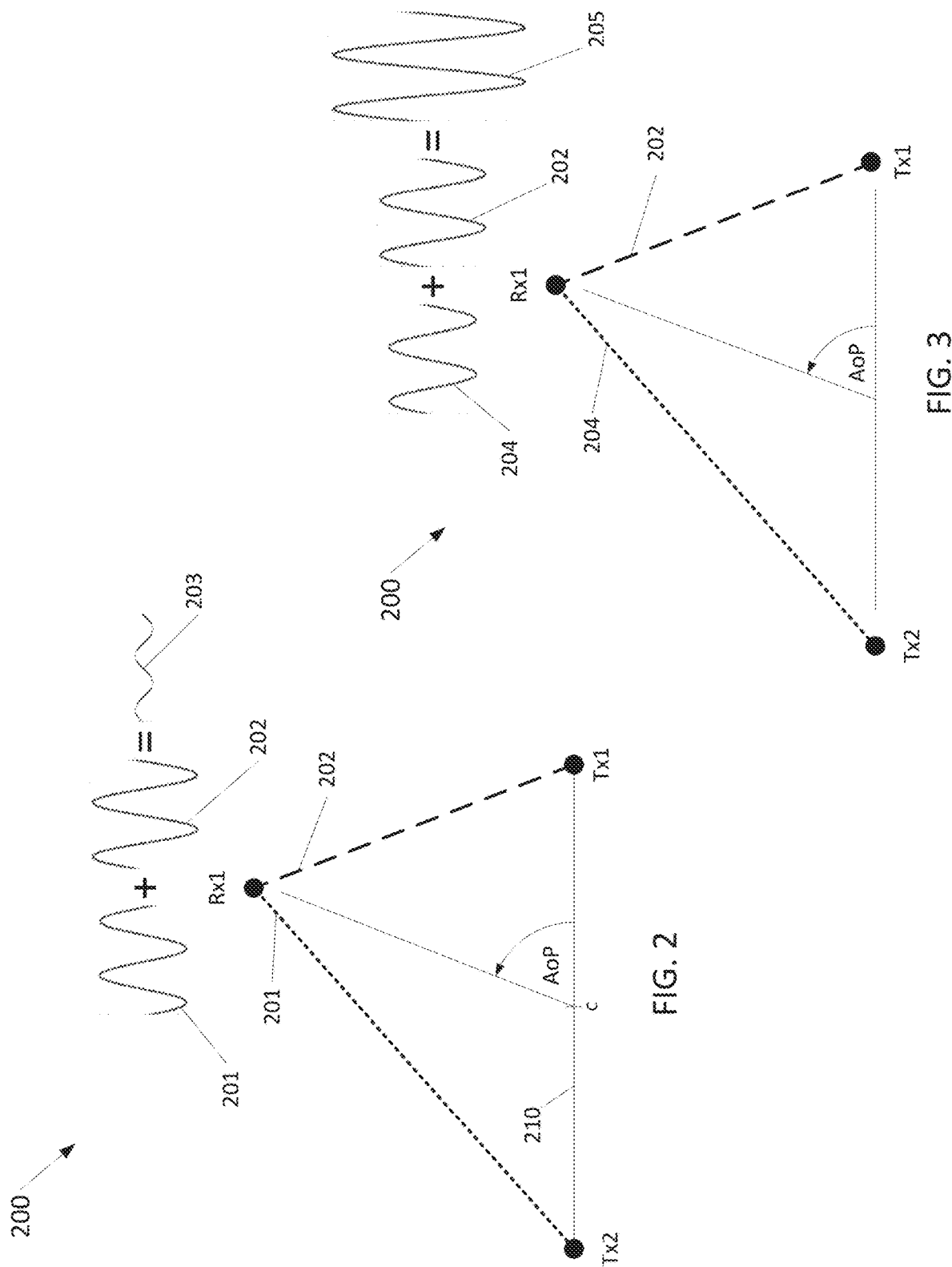

ANGLE OF PROPAGATION ESTIMATION IN A MULTIPATH COMMUNICATION SYSTEM

CROSS-REFERENCE TO RELATED APPLICATIONS

This application claims priority to U.S. Provisional Patent Application No. 62/874,079, filed Jul. 15, 2019, which is incorporated herein by reference.

FIELD

The present disclosure is related to maximizing the received signal-to-noise ratio in a Wi-Fi communications system using channel estimation and beamforming. In particular, the present disclosure is directed to maximizing the received signal-to-noise ratio in a frequency diverse, multi-antenna communication system in a multipath signal environment, using a trained feed-forward neural network to map in-phase and quadrature components of a matrix representation of the communication channel to an angle of arrival.

BACKGROUND

In single frequency multi-antenna Wi-Fi communication systems without multipath, the communication channels can be estimated by transmitting predetermined null-data packets (NDP) $x_i$. In a system with m transmit antennas and n receive antennas, the effect of the channel can be represented by $Y=HX$, where H is an m by n channel matrix, X is the transmitted NDP represented as a diagonal n by m matrix, and Y is the received information represented as an m by n matrix. Each element of the H matrix represents an attenuation and a phase delay for each of the m by n channels (i.e., for each transmit/receive antenna pair). The channel matrix H can then be calculated as $H=YX^{-1}$. The receiving station can then send the H matrix to the transmitting station, where amplitude and phase correction factors can be calculated as an n by m matrix V, which is the inverse of H, normalized to a selected reference channel. The normalized V-matrix can be used to predistort the transmitted signals. That is, if V is the normalized inverse of H, then the received signals Y can be represented by $Y=VHX=(H^{-1}H)=IX=X$, where I is the identity matrix. Alternatively, the receiving station can calculate the correction factors and send them as explicit beamforming feedback to the transmitting station.

However, in frequency diverse (e.g., OFDMA), multiple antenna Wi-Fi communication systems with multipath, signals combine at the receiver in ways that express as unpredictable variations in the amplitude and phase of the H-matrix and V-matrix representations of the communication channels over frequency. A conventional approach to this unpredictability is to average the amplitude and phase components over frequency under the tacit assumption that multipath signals are absent. This approach has proven unsatisfactory for determining an accurate angle of propagation (AoP) and relative channel delays and attenuations in the presence of multipath interference.

SUMMARY

The present disclosure describes example systems and methods for determining line-of-sight angle-of-propagation between transceivers in a multi-channel, multi-carrier communication system in the presence of multipath interference, and for determining the transmission amplitude and phase corrections required to compensate for channel conditions and multipath interference in order to maximize a received signal strength.

In one example, a transceiver is configured to receive frequency dependent channel estimates or beamforming feedback in a multi-carrier, multi-antenna communication system, and a multi-layer perceptron feed forward neural network (FFNN) component, coupled with the transceiver, is configured to estimate parameters of multipath reflections using representations of the channel estimates or beamforming feedback, and to generate transmission correction factors for the transceiver.

In one example, the system also includes a processor, coupled with the transceiver and the FFNN, configured to extract from the channel estimates, frequency dependent n by m H-matrix amplitude and phase data for a plurality of carrier frequencies, or to extract from the beamforming feedback, frequency dependent n by m V-matrix amplitude and phase data for the plurality of carrier frequencies, wherein n is a number of transmit antennas in the communication system, m is a number of receive antennas in the communication system, and the product of m and n is a number of channels in the communication system.

In one example, a memory coupled to the processor and the FFNN is configured to store weights, biases and activation functions for the FFNN, and to store the estimated parameters of multipath reflections, wherein the processor is further configured to adjust a phase and amplitude of transmission channels based on the estimated parameters of multipath reflections.

In one example, the processor is further configured to convert the H-matrix data to a frequency dependent H-spirograph in an FQ plane based on in-phase (I) and quadrature-phase (Q) components of the H-matrix data, or to convert the V-matrix data to a frequency dependent V-spirograph in the FQ plane based on in-phase (I) and quadrature-phase (Q) components of the V-matrix data.

In one example, the FFNN is configured to receive the H-spirograph in-phase and quadrature-phase data at each carrier frequency as input vectors and to output an effective angle-of-propagation, effective channel attenuation of each channel, and effective channel delay of each channel based on characteristics of the H-spirograph, or the FFNN is configured to receive the V-spirograph in-phase and quadrature-phase data at each carrier frequency as input vectors and to output an effective angle-of-propagation, and a relative delay and a relative attenuation of each channel, with respect to a selected reference channel, based on characteristics of the V-spirograph.

In one example, a method includes receiving, at a transceiver in a multi-carrier, multi antenna communication system, one of channel estimates and beamforming estimates for a plurality of carrier frequencies; estimating, with a multi-layer perceptron feed forward neural network (FFNN), parameters of multipath reflections using representations of the channel estimates or beamforming feedback; and adjusting phases and amplitudes of channel transmissions based on the estimated parameters of multipath reflections.

In one example, the method also includes extracting from the channel estimates, in a processor, frequency dependent n by m H-matrix amplitude and phase data for a plurality of carrier frequencies, or extracting from the beamforming feedback, frequency dependent n by m V-matrix amplitude and phase data for the plurality of carrier frequencies, wherein n is a number of transmit antennas in the communication system, m is a number of receive antennas in the communication system, and the product of m and n is a number of channels in the communication system; and in a memory coupled to the processor and the FFNN, storing weights, biases and activation functions for the FFNN, and storing the estimated parameters of multipath reflection.

In one example, the method also includes converting, in the processor, the H-matrix data to a frequency dependent H-spirograph in an I/Q plane based on in-phase (I) and quadrature-phase (Q) components of the H-matrix data, or converting the V-matrix data to a frequency dependent V-spirograph in the I/Q plane based on in-phase (I) and quadrature-phase (Q) components of the V-matrix data.

In one embodiment the method also includes receiving, at the FFNN, the H-spirograph in-phase and quadrature-phase data at each carrier frequency as input vectors and outputting an effective angle-of-propagation, effective channel attenuation, and effective channel delay of each channel based on characteristics of the H-spirograph; or receiving, at the FFNN, the V-spirograph in-phase and quadrature-phase data at each frequency as input vectors and outputting an effective angle-of-propagation and a relative delay and a relative attenuation of each channel, with respect to a selected reference channel, based on characteristics of the V-spirograph.

BRIEF DESCRIPTION OF THE DRAWINGS

For a more complete understanding of various examples, reference is now made to the following detailed description taken in connection with the accompanying drawings in which like identifiers correspond to like elements:

FIG. 2 illustrates an example communication system without multipath interference according to the present disclosure;

FIG. 3 illustrates the communication system of FIG. 2 using channel estimation or beamforming feedback according to the present disclosure;

DETAILED DESCRIPTION

The present disclosure describes examples of systems and methods for determining channel estimates, beamforming feedback estimates, and estimates of the line of sight angle of propagation between transceivers in a multi-frequency, multi-antenna communication system in the presence of multipath interference.

Figure 1:
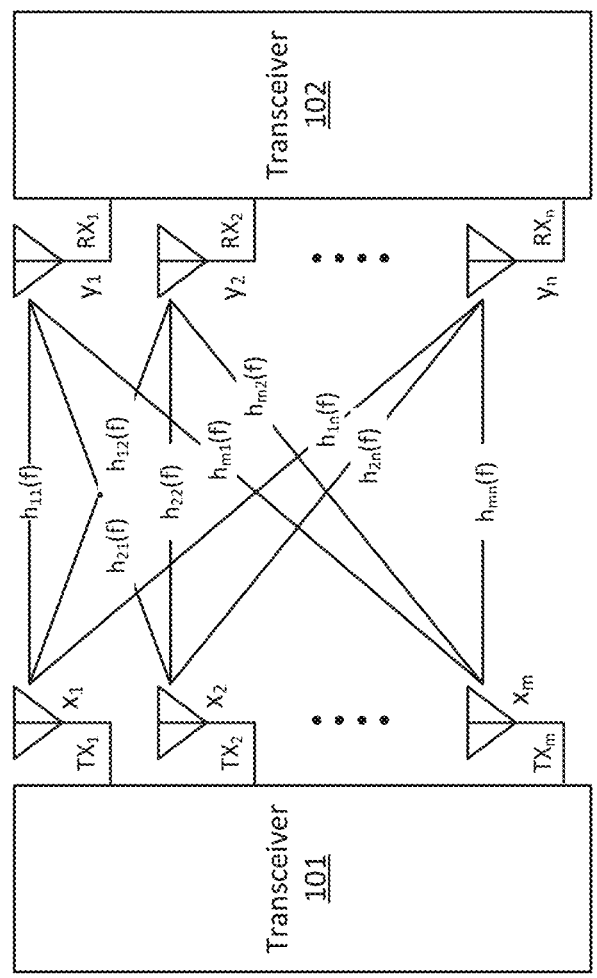
FIG. 1 is a block diagram illustrating an example multi-frequency, multi-antenna communication system according to the present disclosure.

FIG. 1 illustrates an example multi-frequency, multi-antenna communication system 100 comprising two transceivers, transceiver 101 and transceiver 102. As illustrated in FIG. 1, transceiver 101, operating in transmit mode, has m transmitting antennas $TX_1$ through $TX_m$, and transceiver 102, operating in receive mode, has n receiving antennas $RX_1$ through $RX_n$. System 100 may be for example. And without limitation, a Wi-Fi® communication system or a cellular telephone system.

The channel conditions between any pair of antennas in system 100 can be characterized by a frequency-dependent h-parameter that specifies the attenuation and phase delay between the antenna pair. For example, the channel between transmitting antenna $TX_1$ and receiving antenna $RX_1$ is $h_{11}(f)$, where f is the frequency of a subband carrier such as an OFDM (orthogonal frequency division multiplex) carrier in a Wi-Fi® or cellular system. If a symbol stream $x_1$ is transmitting from antenna $TX_1$, then antenna $RX_1$ will receive a symbol stream y1 equal to the product $(h_{11})(x_1)$. This relationship can be generalized to all the channels in system 100 using matrix notation, as illustrated below in equation (1):

$$\begin{bmatrix} y1 \\ \vdots \\ ym \end{bmatrix} = \begin{bmatrix} h11 & \ldots & h1n \\ \vdots & \ddots & \vdots \\ hm1 & \ldots & hmn \end{bmatrix} \begin{bmatrix} x1 \\ \vdots \\ xn \end{bmatrix} \qquad (1)$$

Or in shorthand notation as:

$$Y = HX \qquad (2)$$

Because the H-matrix is initially unknown, signals received by transceiver 102 may combine in unpredictable ways, either by constructive or destructive interference. However, if the transmitted symbol vector X is a training vector known to transceiver 102, then transceiver 102 can estimate the H-matrix as:

$$H = YX^{-1} \qquad (3)$$

where $X^{-1}$ is the inverse of X.

Having estimated the h-matrix for the system, transceiver 102 can then determine how to adjust its own transmission gains and phases to compensate for the channel attenuations and delays, and transmit the H-matrix to transceiver 101 so it can make the same adjustments and maximize the received signal strength of its transmissions at transceiver 102.

Alternatively, because the channels are reciprocal, transceiver 102 can simply send the required adjustments directly to transceiver 101 as beam forming feedback so that transceiver 101 can make the adjustments without having to manipulate the H-matrix data. This matrix data, which is the inverse of the H-matrix, referred to as the V-matrix, can be used to directly adjust the gains and phases of the transmissions of transceiver 101 to compensate for the channels. So, instead of transmitting X, transceiver 101 transmits:

$$VX = H^{-1}X \quad (4)$$

so that transceiver 102 receives:

$$Y = HVX = HH^{-1}X = X \quad (5)$$

Transceiver 101 can then apply the same corrections to its normal data transmissions. To compensate for changing channel conditions, the channel estimation and beamforming feedback operations described above can be repeated periodically. However, as noted above, this channel calibration process may break down in the presence of multipath interference.

FIG. 2 illustrates a 2 by 1 communication system 200 with two transmitting antennas TX1 and TX2 and one receiving antenna RX1, without multipath interference and without H-matrix or V-matrix derived corrections. In the example of FIG. 2, the position of RX1 with respect to the center C of the transmission baseline 210, causes the angle of propagation (AoP) to be some acute angle and the line of sight (LOS) signals from TX1 (201) and TX2 (202) to combine out of phase with different amplitudes (due to different path lengths), resulting in destructive interference at RX1 as illustrated by combined signal 203. It should be noted that even if the AoP was a right angle, and the path lengths for signals 201 and 202 were equal, they could still combine out of phase due to phase mismatches in the analog front ends of the transmitters associated with TX1 and TX2.

FIG. 3 illustrates the effect of correcting the transmission phase of TX2 (204) relative to TX1 (202), based on the H-matrix or V-matrix data, to generate constructive interference between the TX1 and TX2 signals as illustrated by combined signal 205 in FIG. 3. Additionally, the angle of propagation (AoP) can be determined from the known frequency of the transmission and the amount of phase shift required to maximize signal 205.

Figure 4:
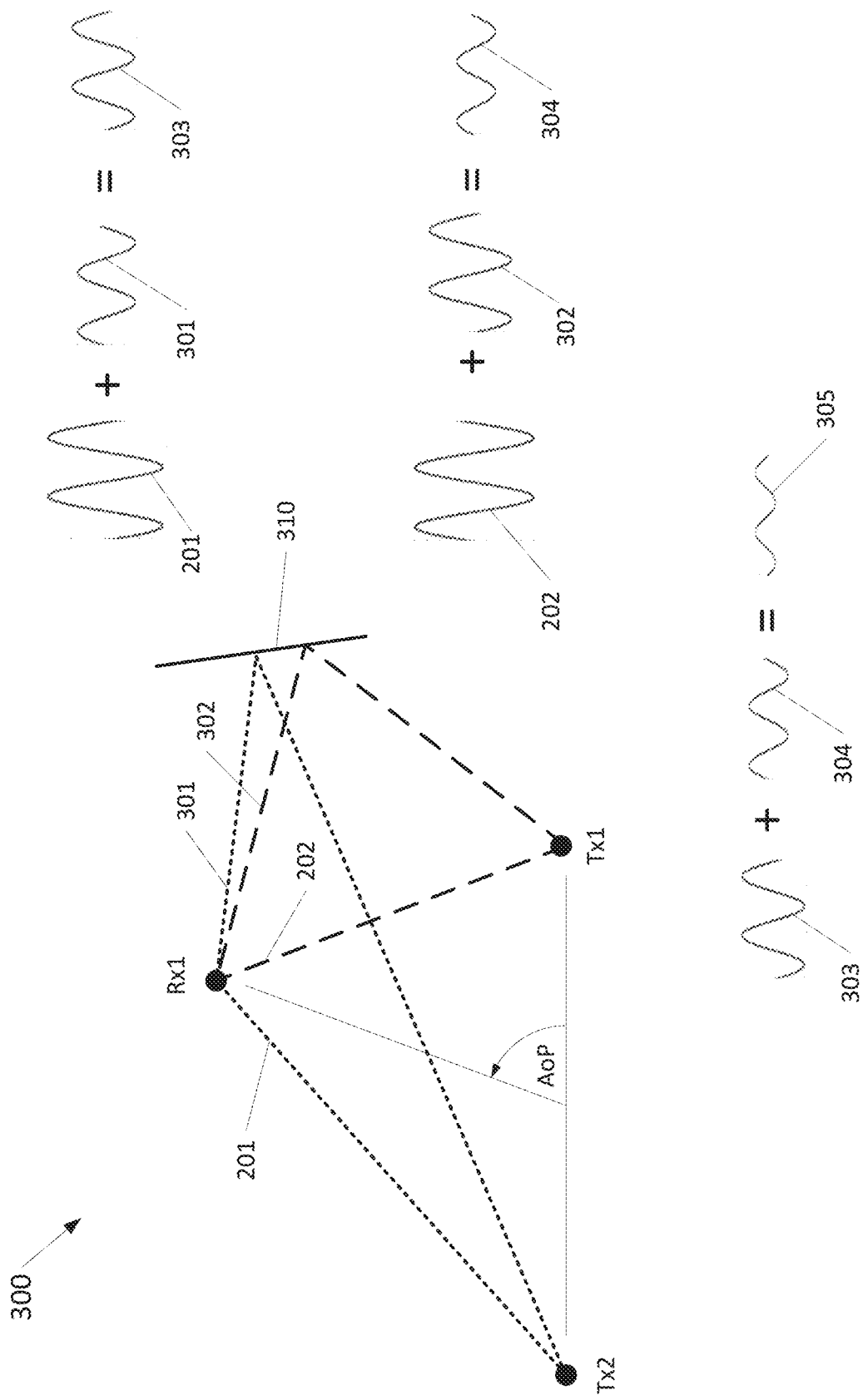
FIG. 4 illustrates an example communication system with one multipath signal per channel according to the present disclosure.

However, the presence of multipath interference can render the conventional H-matrix or V-matrix approach ineffective, as illustrated in FIG. 4. FIG. 4 illustrates a communication system 300, similar to system 200, but with a reflecting surface 310 in the environment. In FIG. 4, LOS signal 201 combines with reflected signal 301 to produce a combined signal 303, and LOS signal 202 combines with reflected signal to produce combined signal 304. In this scenario, the receiver RX1 cannot distinguish between LOS and reflected signals, so it assumes that combined signal 303 is a LOS signal from TX2 and that combined signal 304 is a LOS signal from TX1. These two signals combine at RX1 to produce combined signal 305, as illustrated in FIG. 4. Comparing FIG. 2 with FIG. 4, it can be seen that the apparent LOS signal 303 from TX2 in FIG. 4 is very different from the actual LOS signal 201 from TX2 in FIG. 2, and that the apparent LOS signal 304 from TX1 in FIG. 4 is very different from the actual LOS signal 202 from TX1 in FIG. 2. As a result, the overall combined signal 305 at RX1 in FIG. 4 is also very different from the overall combined signal 203 in FIG. 2.

Figure 5:
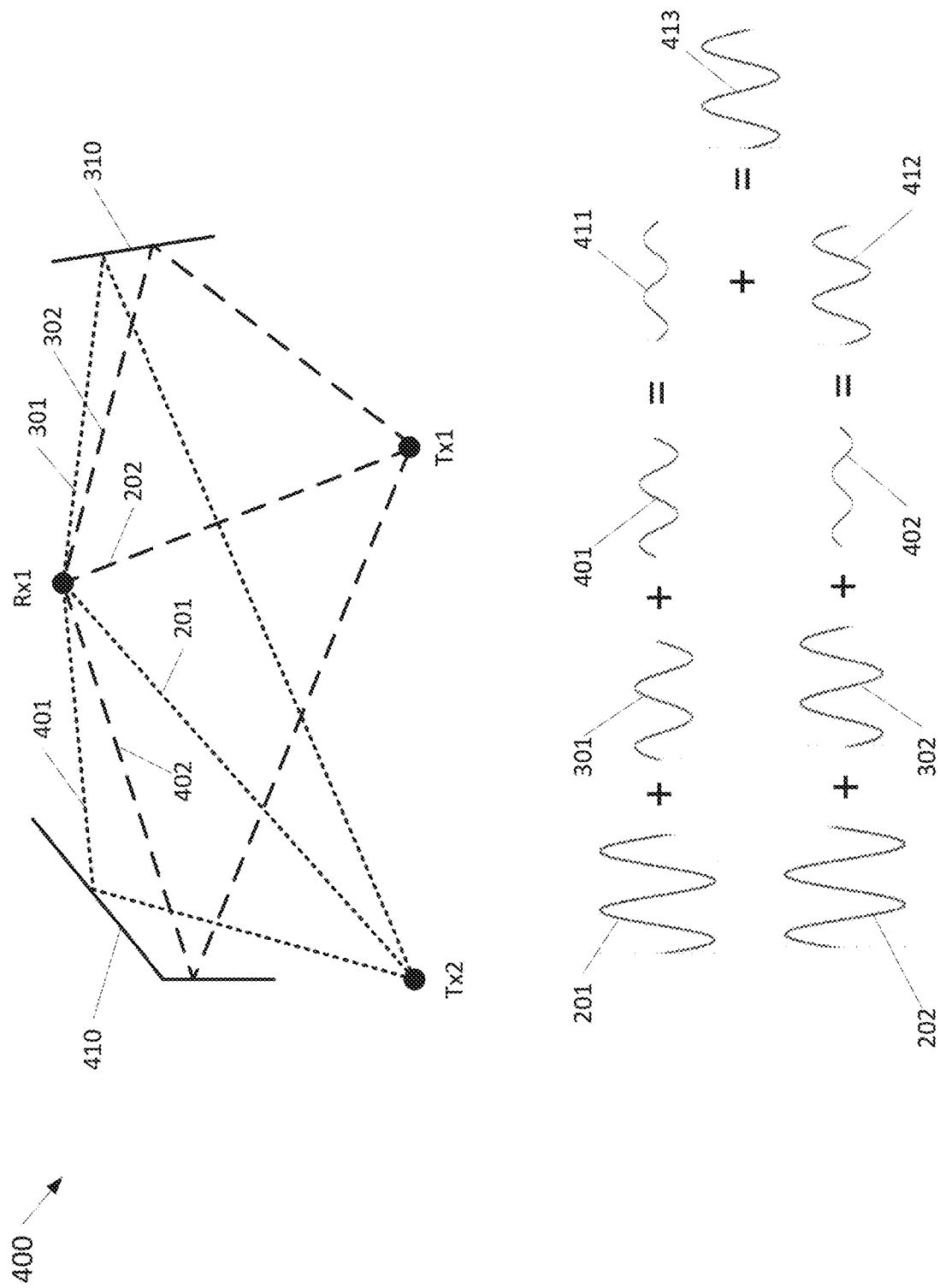
FIG. 5 illustrates an example communication system with two multipath signals per channel.

It follows that the H-matrix or the V-matrix calculated from the received signals in FIG. 4 will be very different from the matrices calculated from the received signals in FIG. 2. Moreover, in a multi-carrier system such as an OFDM system, the "apparent" H-matrix and V-matrix change unpredictably. And the level of unpredictability increases as the number of multipath signals increases. FIG. 5 illustrates an example communication system 400, similar to system 300, but having an additional reflecting surface 410 that creates two additional multipath signals 401 and 402. These signals combine with the previously described LOS and multipath signals to produce a signal 411 at RX1 that appears to be a LOS signal from TX2, and a signal 412 at RX1 that appears to be a LOS signal from TX1. These two signals combine at RX1 to produce an overall received signal at RX1 that is different from combined signal 203 in FIG. 2 or combined signal 305 in FIG. 4.

Figure 6:
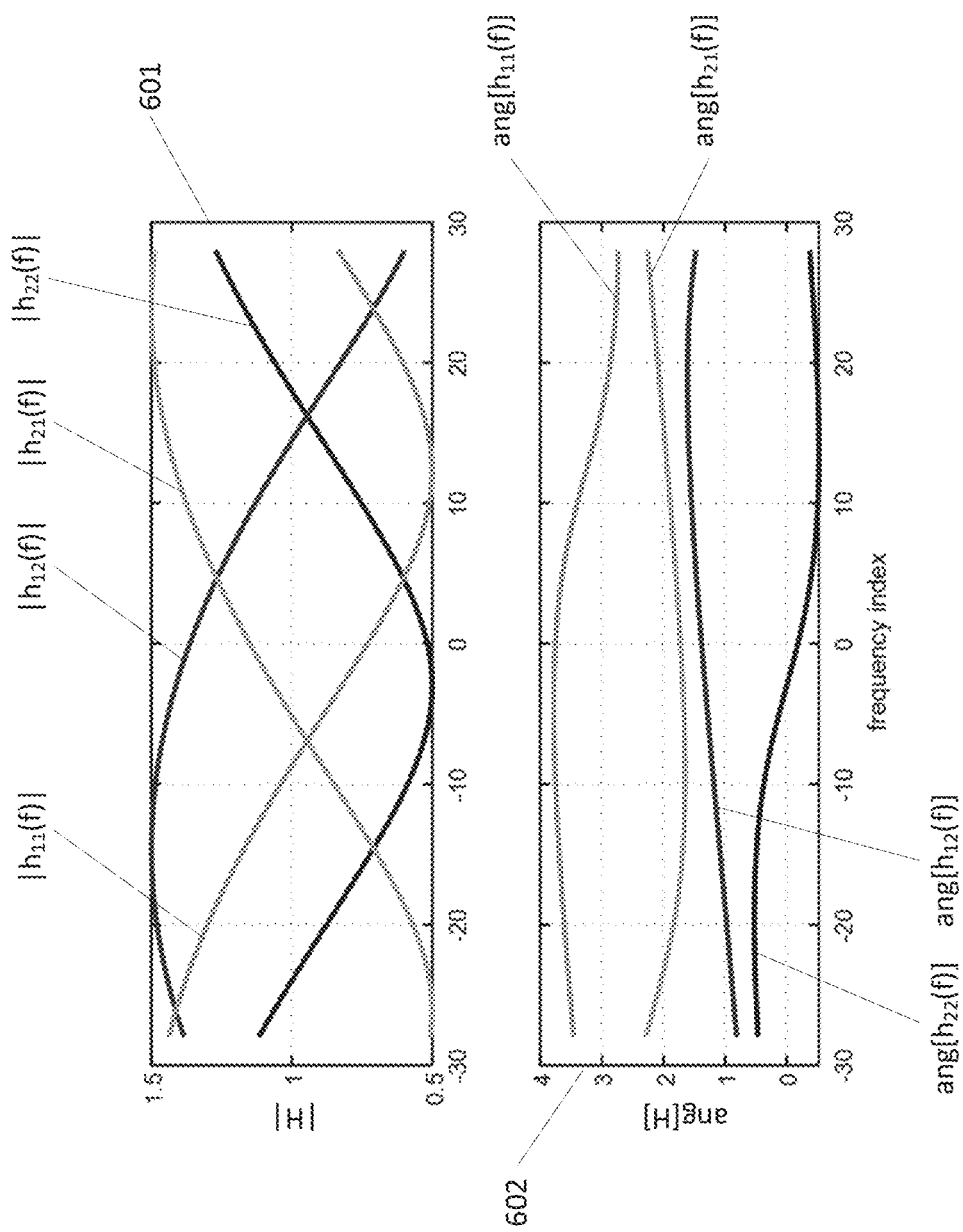
FIG. 6 is a graphical representation of frequency dependent channel estimates in a multipath environment according to the present disclosure.

FIG. 6 is a graphical illustration of the variation in H-matrix parameters with frequency for a communication system with two transmitting antennas and two receiving antennas, such that the H-matrix has four complex parameters: $h_{11}(f)$, $h_{12}(f)$, $h_{21}(f)$ and $h_{22}(f)$, where f represents the frequency. Graph 601 in FIG. 6 plots the variations in the magnitudes of the four h-parameters with frequency ($|h_{xy}(f)|$), while graph 602 in FIG. 6 plots the variations in the phase angles of the four h-parameters with frequency ($ang[h_{xy}(f)]$). The horizontal axes in graph 601 and graph 602 represent normalized frequency indexes of sub-carriers with respect to a reference center frequency with index 0. The vertical axis of graph 601 represents the normalized amplitudes of the h-parameters versus frequency with respect to a reference amplitude of one of the h-parameters at a selected frequency. The vertical axis of graph 602 represents the normalized phases of the h-parameters versus frequency with respect to a reference phase of one of the h-parameters at a selected frequency. A similar magnitude and phase representation (not shown) can be made with the V-matrix parameters, although the curves will be different due to the inverse qualities of the V-matrix with respect to the H-matrix.

Figure 7:
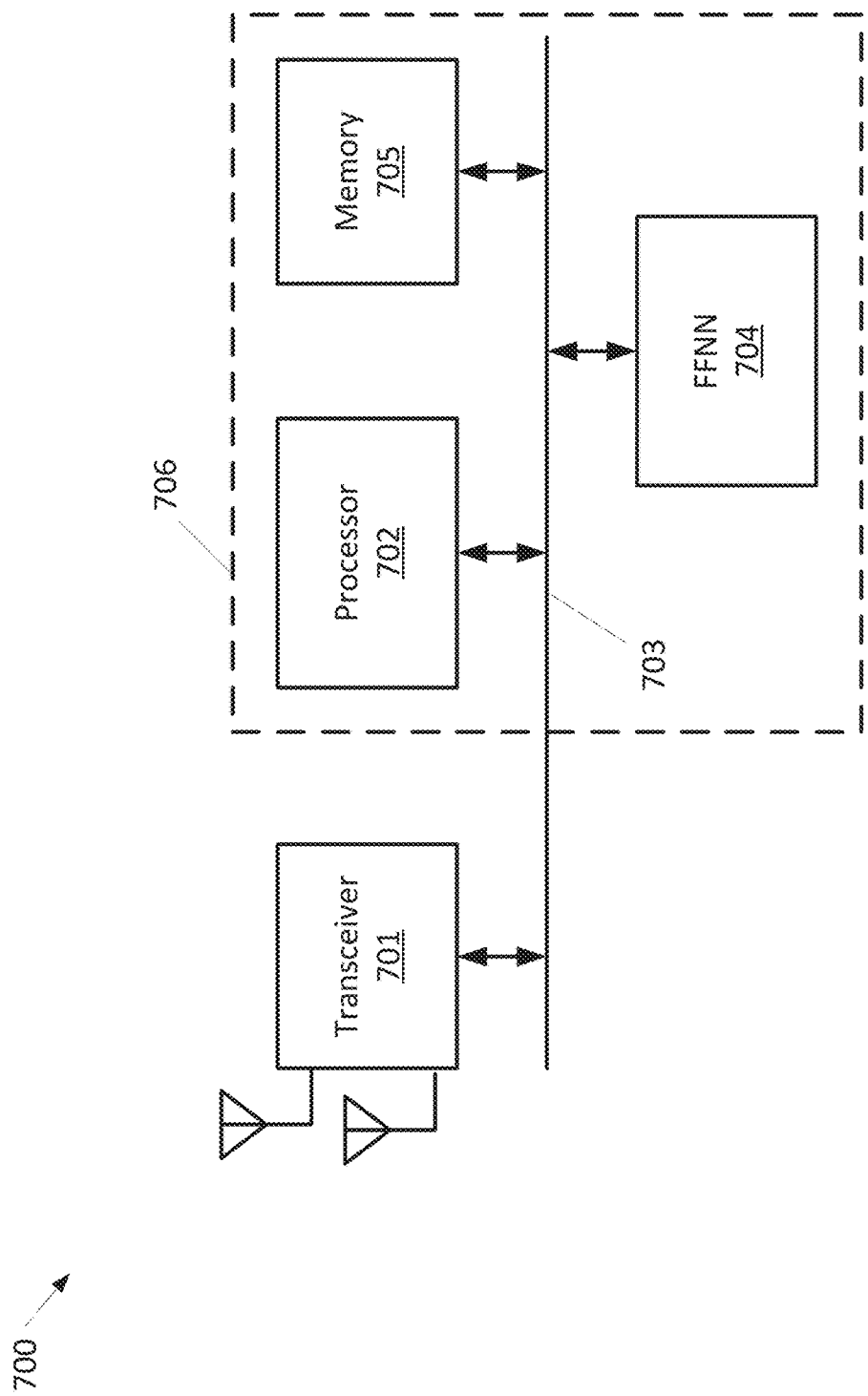
FIG. 7 is a block diagram illustrating an example system for determining angle of propagation in a multipath signal environment according to the present disclosure.

FIG. 7 illustrates an example system 700 for estimating angle of propagation in a multipath signal environment according to the present disclosure. System 700 includes a transceiver 701 configured to receive channel estimates or beamforming feedback in a multi-carrier, multi-antenna communication system, and to output digitized channel estimates or beamforming feedback. System 700 also includes a processor 702, coupled to the transceiver 701 by a communication bus 703, configured to receive the digitized channel estimates or beamforming feedback from the transceiver 701. The processor is also configured to extract from the channel estimates, frequency dependent n by m H-matrix amplitude and phase data (such as amplitude data 601 and phase data 602) for a plurality of carrier frequencies, or to extract from the beamforming feedback, frequency dependent n by m V-matrix amplitude and phase data for the plurality of carrier frequencies, wherein n is a number of transmit antennas in the communication system, m is a number of receive antennas in the communication system, and the product of m and n is a number of channels in the communication system.

Processor 702 may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

System 700 also includes a multi-layer perceptron feed forward neural network (FFNN) 704, coupled with the transceiver 701 and the processor 702 by communication bus 703, that is configured to estimate parameters of multipath reflections using representations of the channel estimates or beamforming feedback, and to generate transmission correction factors for the transceiver 701.

System 700 also includes a memory 705 coupled to the transceiver 701, the processor 702, and the FFNN 704 by communication bus 703, to store weights, biases and activation functions for the FFNN 704, and to store the estimated parameters of multipath reflections. Memory 705 may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a Direct Rambus® DRAM (DRDRAM).

In one example, processor 702, communication bus 703, FFNN 704 and memory 705 may be implemented as a system on a chip (SoC) 706. In another example, transceiver 701, processor 702, communication bus 703, FFN and memory 705 may comprise an IEEE 802 compatible Wi-Fi® access point.

In one example, the processor 702 is further configured to adjust the phases and amplitudes of the transceivers transmission channels based on the estimated parameters of multipath reflections. In one example, the processor is further configured to convert the digitized H-matrix amplitude and phase data to frequency dependent H-matrix based spirographs (H-spirographs) in the I/Q plane based on in-phase (I) and quadrature-phase (Q) components of the H-matrix data, or to convert the V-matrix data to frequency dependent V-matrix based spirographs (V-spirographs) in the I/Q plane based on in-phase (I) and quadrature-phase (Q) components of the V-matrix data.

Figure 8:
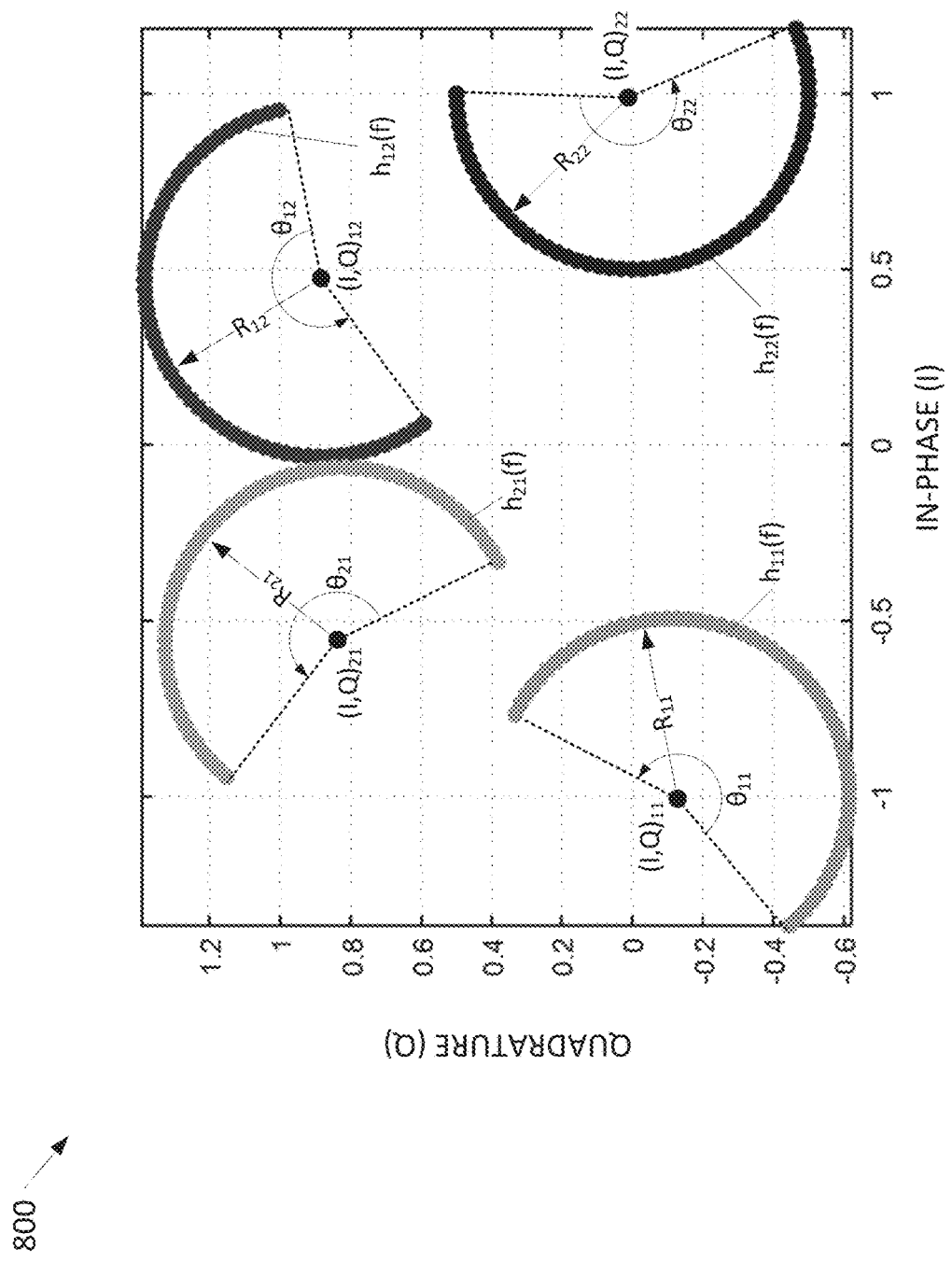
FIG. 8 is a graphical representation of frequency dependent channel estimates in a multipath signal environment according to the present disclosure.

The H-matrix conversion is illustrated in FIG. 8, where the H-matrix based spirographs (H-spirographs) for an example 2 by 2 communication system (such as communication system 100 with m=2 and n=2) with one multipath reflection per channel (such as system 300) are plotted in the I/Q plane in graph 800. The I-component for each h-parameter is given by $|h_{xy}|\cos \phi_{xy}$, where $|h_{xy}|$ is the magnitude of parameter $h_{xy}$ and $\phi_{xy}$ is the phase angle of parameter $h_{xy}$ (where the frequency index has been omitted). The Q-component for each h-parameter is given by $|h_{xy}|\sin \phi_{xy}$.

For the one multipath reflection case illustrated in FIG. 8, the H-spirographs are each characterized by a circular arc in the I/Q plane having a center with coordinates $(I,Q)_{xy}$, a radius $R_{xy}$, and an arc span $\theta_{xy}$. By modeling and simulating many different single multipath scenarios, it can be shown that the locations of the centers of the circular arcs $(I,Q)_{xy}$ are a function of analog chain mismatches in the front ends of the system's transceivers and the line of sight (LOS) angle of propagation (AoP). It can also be shown that the radiuses of the circular arcs $R_{xy}$ are a function of the magnitude of the multipath reflection for each channel relative to the magnitude of the LOS signal for that channel. One consequence of this relationship between the radiuses of the H-spirographs and the strength of the multipath reflections, is that in the absence of multipath reflections, the H-spirographs degenerate to the single points $(I,Q)_{xy}$, independent of frequency.

It can also be shown that the spans of the circular arcs $\theta_{xy}$ are a function of the phase of the multipath reflection relative to the LOS signal and by the angle-of-propagation of the multipath reflection relative to the LOS signal. Finally, for the one multipath case, the circular arcs are congruent. That is, they can be made to overlap each other under a single rotation and a single translation in the I/Q plane.

Figure 9:
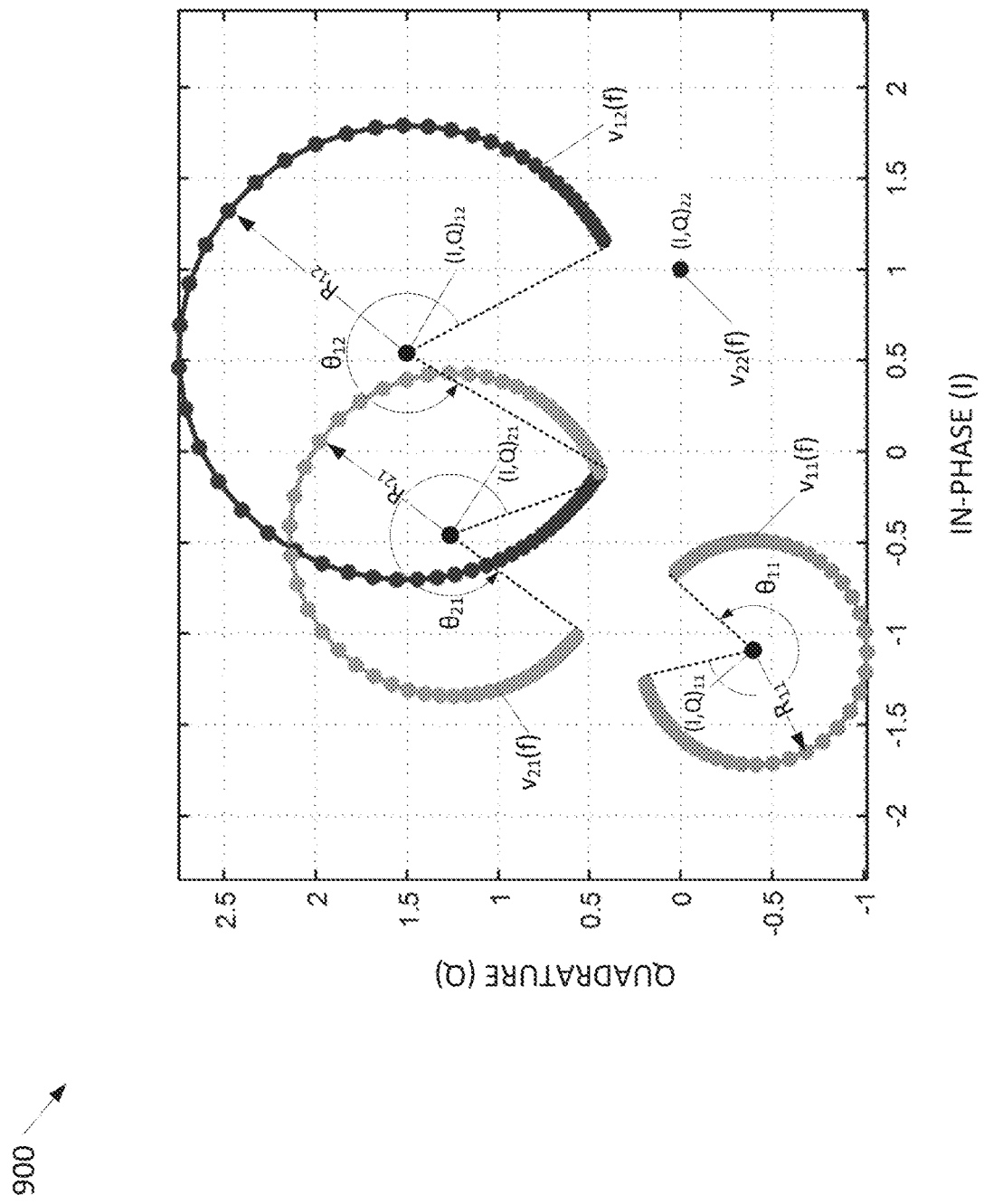
FIG. 9 is a graphical representation of frequency dependent beamforming feedback estimates in a multipath signal environment according to the present disclosure.

The V-matrix conversion is illustrated in FIG. 9, where the V-matrix based spirographs (V-spirographs) for an example 2 by 2 communication system (such as communication system 100 with m=2 and n=2) with one multipath reflection per channel (such as system 300) are plotted in the I/Q plane in graph 900. The graph 900 in FIG. 9 differs from the graph 800 in FIG. 8 in at least one respect. While the h-parameters represent estimates of absolute channel conditions, the v-parameters represent estimates of the relative changes in the transmitted signals needed to compensate for the channel conditions. Accordingly, the v-parameters can be normalized with respect to a reference channel. In the example of graph 900 in FIG. 9, the channel associated with $v_{22}$ has been selected as the reference channel, and the other three channels have been normalized to their differences with respect to $v_{22}$. As a result, the $v_{22}$ trace in graph 900 appears as a single, frequency independent point $(I,Q)_{22}$.

For the other three v-parameters in graph 900, the V-spirograph for the I-component is given by $|v_{xy}|\cos \phi_{xy}$, where $|v_{xy}|$ is the relative magnitude of parameter $v_{xy}$ to the magnitude of $|v_{22}|$ and $\phi_{xy}$ is the relative phase angle of parameter $v_{xy}$ to the phase of $v_{22}$. Similarly, the Q-component for each v-parameter is given by $|v_{xy}|\sin \phi_{xy}$.

For the one multipath reflection case illustrated in FIG. 9, the V-spirographs (other than the reference channel) are each characterized by a circular arc in the I/Q plane having a center with coordinates $(I,Q)_{xy}$, a radius $R_{xy}$, and an arc span $\theta_{xy}$ with non-uniformly spaced frequency points. By modeling and simulating many different single multipath scenarios, it can be shown that the location of the center of the circular arc, the radius of the circular arc, and the span of the circular arc determined by analog chain mismatches in a front end of the transceiver, a line of sight (LOS) angle-of-propagation of the channel, a magnitude of the multipath reflection relative to the LOS signal, a phase of the multipath reflection relative to the LOS signal and by the angle-of-propagation of the multipath reflection relative to the LOS signal.

In the absence of multipath interference, in similar fashion to the H-spirographs, all of the V-spirographs degenerate to the single points $(I,Q)_{xy}$, independent of frequency. Also, the V-spirographs for all channels with one multipath reflection, relative to the selected reference channel, are similar under a translation, a rotation and a radial scaling.

Figure 10:
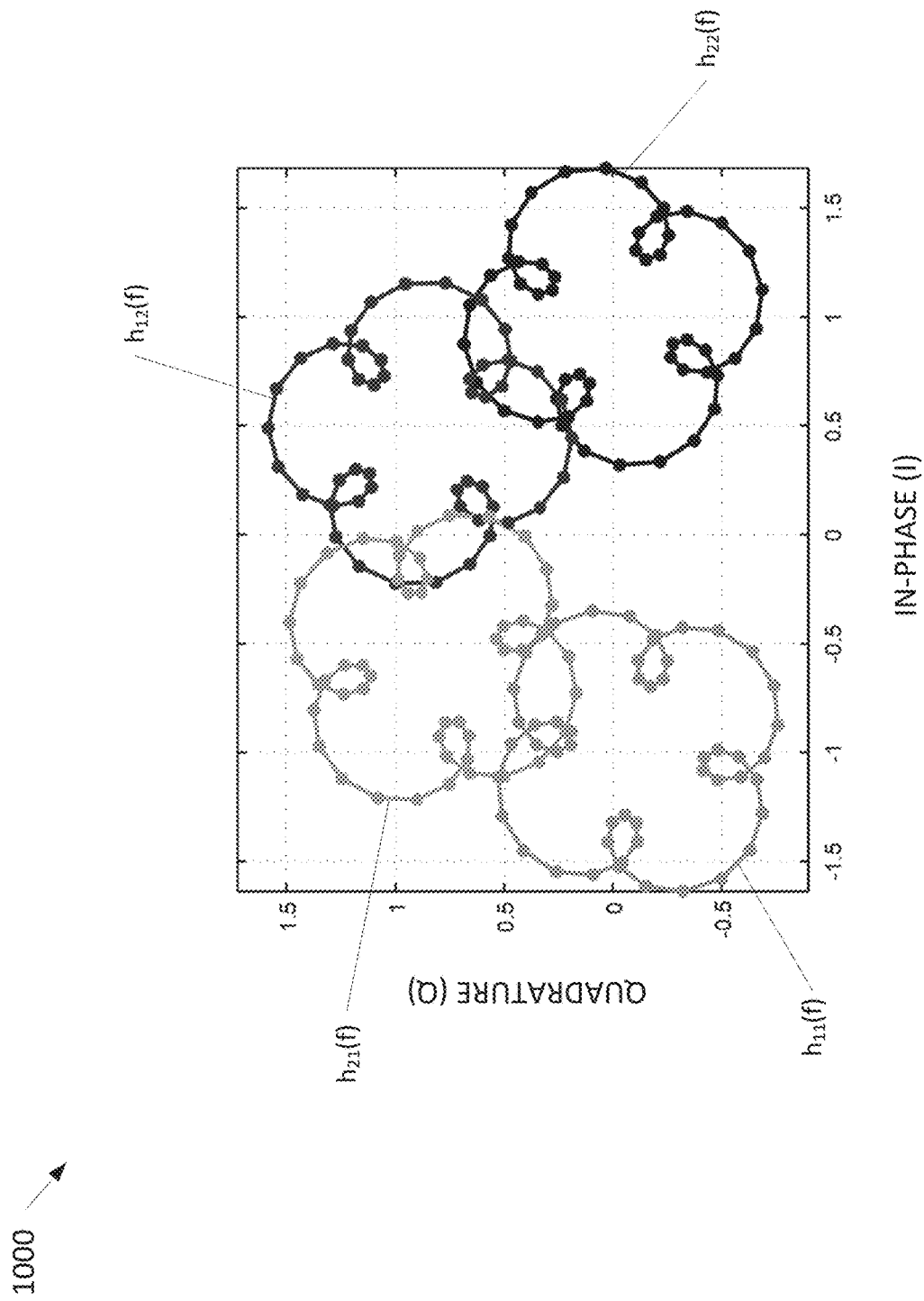
FIG. 10 is a graphical representation of frequency dependent channel estimates in a second order multipath signal environment.

FIG. 10 is a graph 1000 in the I/Q plane illustrating H-spirographs for the case of two multipath reflections in each channel (similar to system 400 in FIG. 5) as a function of frequency. By modeling and simulating many two multipath reflection scenarios, it can be shown that the h-parameters in the FQ plane, $h_{11}(f)$, $h_{12}(f)$, $h_{21}(f)$ and $h_{22}(f)$, are congruent compound hypocycloids that can be overlapped under one translation and one rotation in the FQ plane.

Figure 11:
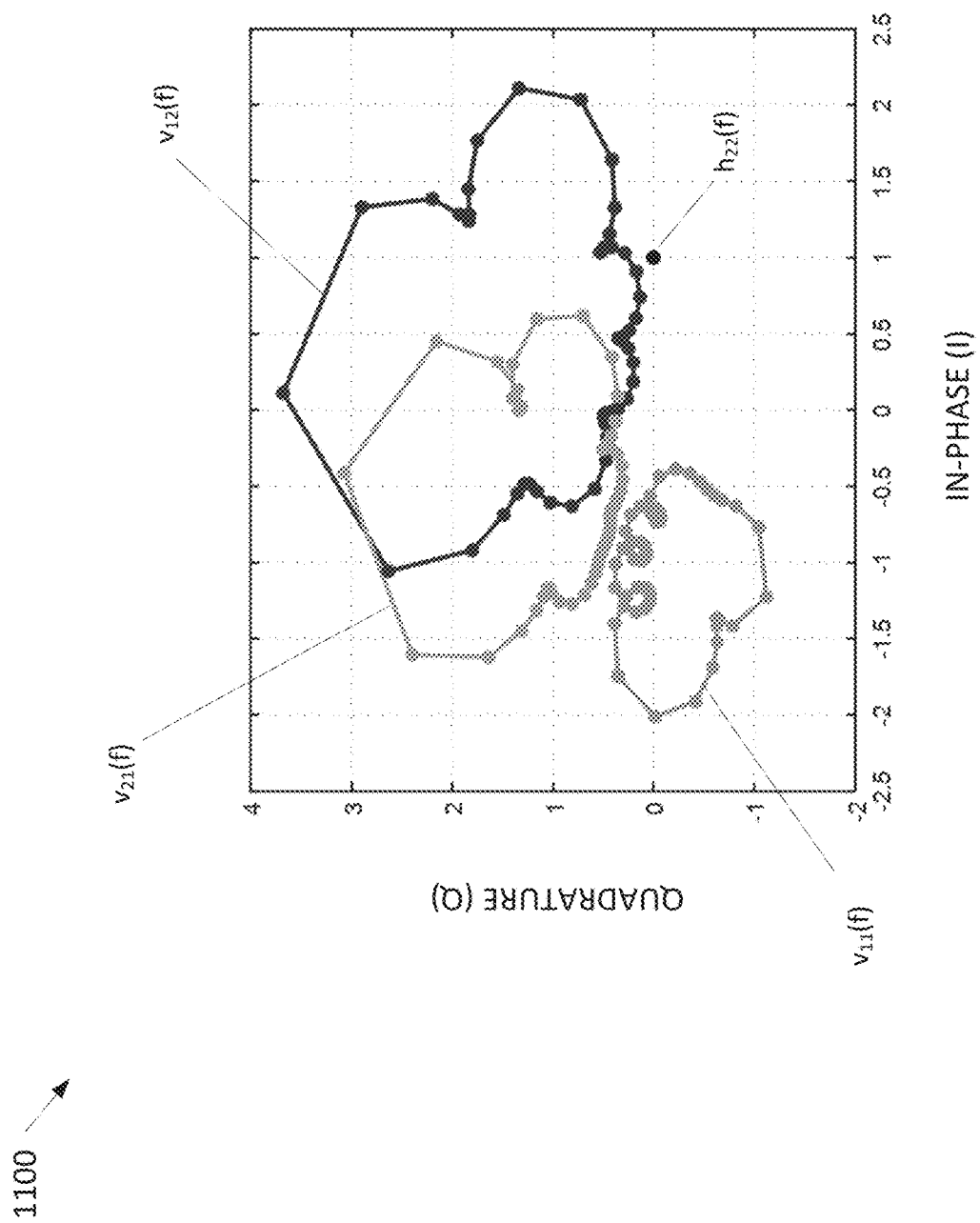
FIG. 11 is a graphical representation of frequency dependent beamforming feedback estimates in a second order multipath signal environment.

FIG. 11 is a graph 1100 in the I/Q plane illustrating V-spirographs for the case of two multipath reflections in each channel (similar to system 400 in FIG. 5) as a function of frequency. By modeling and simulating many two multipath reflection scenarios, it can be shown that the v-parameters in the FQ plane, relative to the reference V-spirograph, are similar under a rescaling, a rotation and a resampling.

It will be appreciated that the multipath scenarios illustrated in FIGS. 8-11 are under-constrained and are not subject to a direct analytical solution. However, the same modeling and simulations used to characterize the H-spirographs and V-spirographs in the foregoing description can be used as training data to train the multi-layer perceptron feed forward neural network 704, in system 700, to estimate the multipath reflection parameters, to determine the angle of propagation, and to apply corrections to the transmitted signals to maximize received signal strength.

Figure 12:
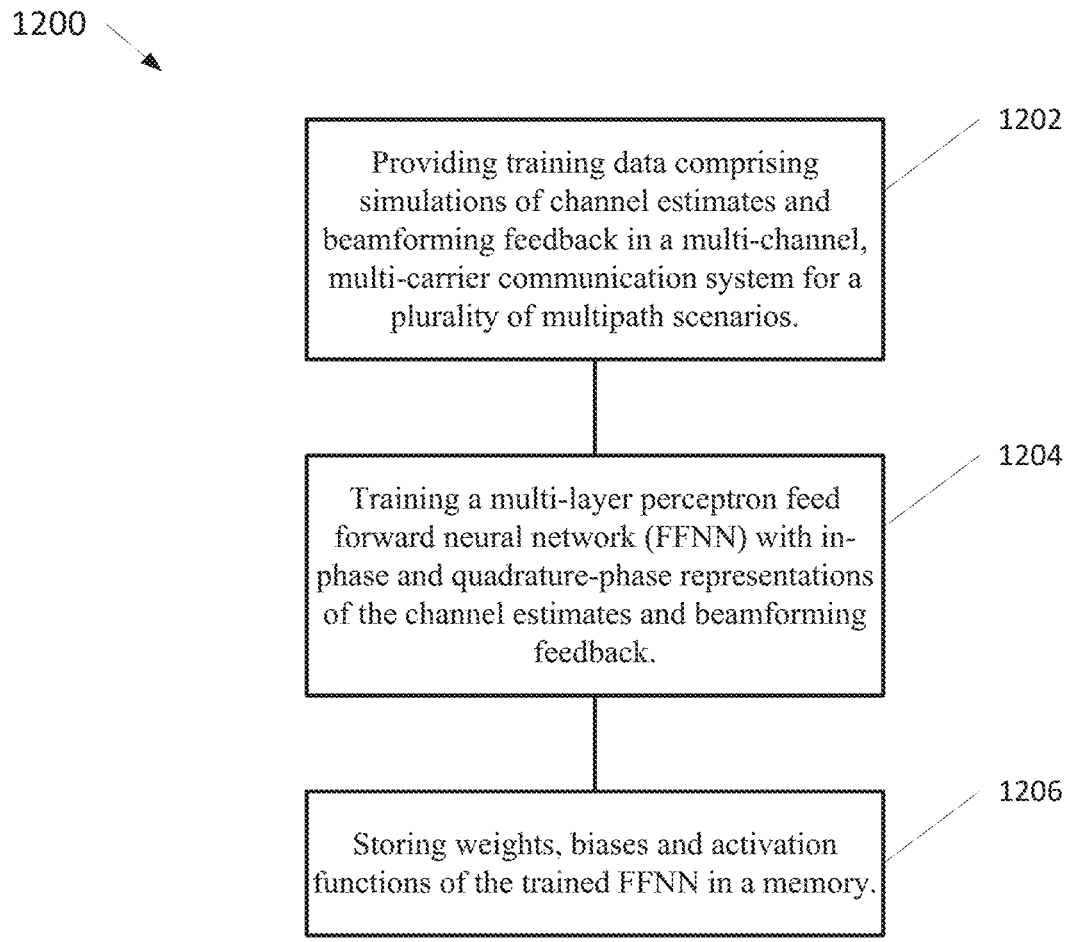
FIG. 12 is a flowchart illustrating an example method for training a neural network to estimate angle of propagation in a multipath signal environment according to the present disclosure.

FIG. 12 is a flowchart illustrating an example method 1200 for training a multi-layer perceptron feed forward neural network (e.g., FFNN 704) to estimate angle of propagation and parameters of multipath reflections using representations of channel estimates and beamforming feedback in a multi-frequency, multi-antenna communication system. Method 1200 begins at operation 1202, providing training data comprising simulations of channel estimates and beamforming feedback in a multi-channel, multi-carrier communication system for a plurality of multipath scenarios. Method 1200 continues at operation 1204, training the multi-layer perceptron feed forward neural network with in-phase and quadrature-phase representations of the channel estimates (e.g., H-spirographs) and beamforming feedback (e.g., V-spirographs), to estimate parameters of multipath reflections. Method 1200 concludes with operation 1206, storing weights, biases and activation functions of the trained feed forward neural network in a memory.

In one example, operation 1204, training the multi-layer perceptron feed forward neural network (FFNN), comprises generating spirographic feature sets from the in-phase and quadrature representations of the channel estimates and beamforming feedback for each of the plurality of multipath scenarios, for each channel at each carrier frequency, applying the feature sets in batches to the FFNN in a forward pass to generate a loss function comprising a representation of the training data, and propagating the loss function in a backward pass through the neural network to update weights and biases of the neural network to minimize the loss function.

Figure 13:
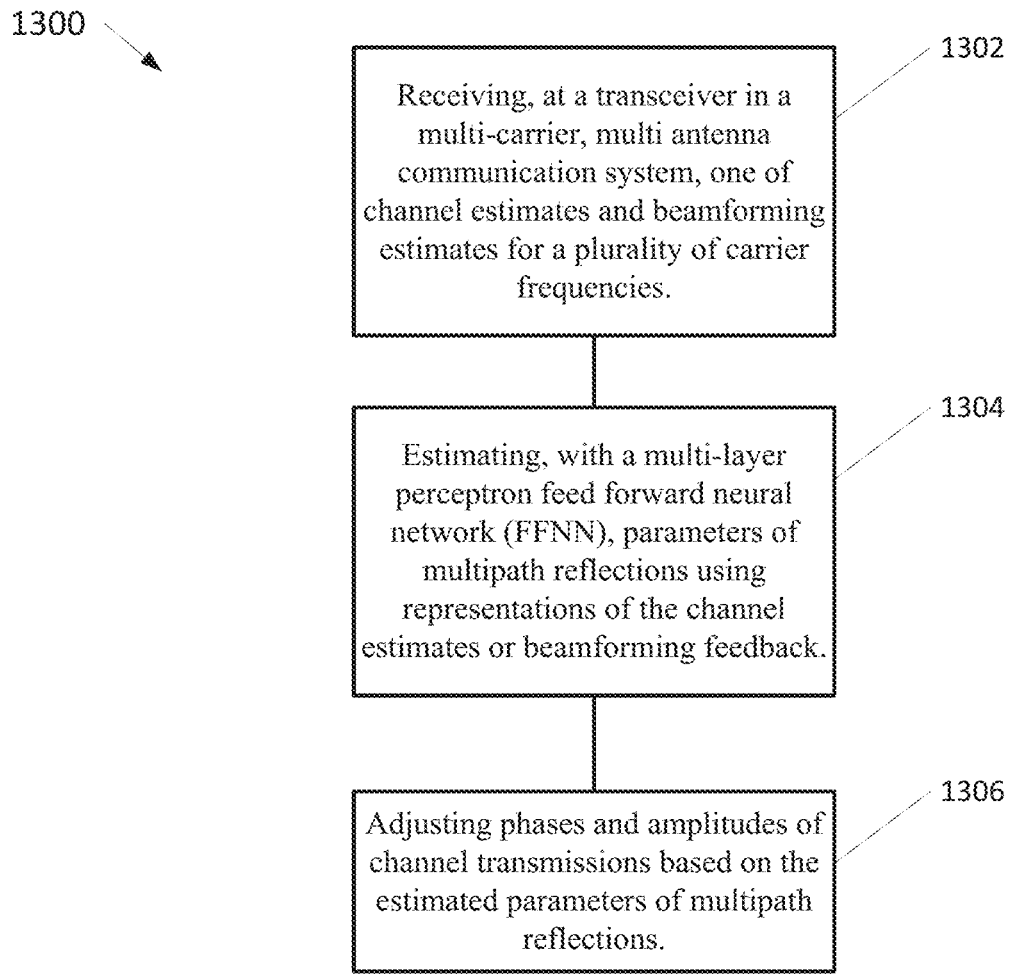
FIG. 13 is a flowchart illustrating an example method for determining angle of propagation in a multipath signal environment according to the present disclosure.

FIG. 13 is a flowchart illustrating an example method 1300 according to the present disclosure for determining angle of propagation in a multipath signal environment. Method 1300 begins at operation 1302, receiving, at a transceiver (e.g., transceiver 701) in a multi-carrier, multi antenna communication system (e.g., system 700), one of channel estimates (e.g., H-matrices) and beamforming estimates (e.g., V-matrices) for a plurality of carrier frequencies. Method 1300 continues at operation 1304, estimating, with a multi-layer perceptron feed forward neural network (FFNN), parameters of multipath reflections using representations of the channel estimates (e.g., H-spirographs) or beamforming feedback (e.g., V-spirographs). Method 1300 continues at operation 1306, adjusting phases and amplitudes of channel transmissions based on the estimated parameters of multipath reflections.

In one example, method 1300 also includes extracting from the channel estimates, in a processor, frequency dependent n by m H-matrix amplitude and phase data for a plurality of carrier frequencies, or extracting from the beamforming feedback, frequency dependent n by m V-matrix amplitude and phase data for the plurality of carrier frequencies, where n is a number of transmit antennas in the communication system, m is a number of receive antennas in the communication system, and the product of m and n is a number of channels in the communication system, and in a memory coupled to the processor and the FFNN, storing weights, biases and activation functions for the FFNN, and storing the estimated parameters of multipath reflection.

In one example, method 1300 also includes converting, in the processor, the H-matrix data to a frequency dependent H-spirograph in an I/Q plane based on in-phase (I) and quadrature-phase (Q) components of the H-matrix data, or converting the V-matrix data to a frequency dependent V-spirograph in the I/Q plane based on in-phase (I) and quadrature-phase (Q) components of the V-matrix data.

In one example, method 1300 also includes receiving, at the FFNN, the H-spirograph in-phase and quadrature-phase data at each carrier frequency as input vectors and outputting an effective angle-of-propagation, effective channel attenuation, and effective channel delay of each channel based on characteristics of the H-spirograph; or receiving, at the FFNN, the V-spirograph in-phase and quadrature-phase data at each frequency as input vectors and outputting an effective angle-of-propagation and a relative delay and a relative attenuation of each channel, with respect to a selected reference channel, based on characteristics of the V-spirograph.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein re shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated examples of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system, comprising:
a transceiver configured to receive frequency dependent channel estimates or beamforming feedback in a multi-carrier, multi-antenna communication system; and
a multi-layer perceptron feed forward neural network (FFNN) component, coupled with the transceiver, configured to estimate parameters of multipath reflections using representations of the channel estimates or the beamforming feedback, and to generate transmission correction factors for the transceiver; and
a processor coupled with the transceiver and the FFNN, configured to extract from the channel estimates, frequency dependent n by m H-matrix amplitude and phase data for a plurality of carrier frequencies, or to extract from the beamforming feedback, frequency dependent n by m V-matrix amplitude and phase data for the plurality of carrier frequencies, wherein n is a number of transmit antennas, m is a number of receive antennas, and the product of m and n is a number of channels in the communication system, and wherein m and n are natural numbers.

2. The system of claim 1, further comprising:
a memory coupled to the processor and the FFNN to store weights, biases and activation functions for the FFNN, and to store the estimated parameters of multipath reflections, wherein the processor is further configured to adjust a phase and amplitude of transmission channels based on the estimated parameters of multipath reflections.

3. The system of claim 2, wherein the processor, the FFNN, the memory and the communication bus comprise a system on a chip (SoC).

4. The system of claim 2, wherein the transceiver, the processor, the FFNN and the memory comprise an IEEE 802 compatible Wi-Fi® access point.

5. The system of claim 2, wherein the processor is further configured to convert the H-matrix data to a frequency dependent H-spirograph in an I/Q plane based on in-phase (I) and quadrature-phase (Q) components of the H-matrix data, or to convert the V-matrix data to a frequency dependent V-spirograph in the I/Q plane based on in-phase (I) and quadrature-phase (Q) components of the V-matrix data.

6. The system of claim 5, wherein:
the FFNN is configured to receive the H-spirograph in-phase and quadrature-phase data at each carrier frequency as input vectors and to output an effective angle-of-propagation, effective channel attenuation of each channel, and effective channel delay of each channel based on characteristics of the H-spirograph, and wherein,
the FFNN is configured to receive the V-spirograph in-phase and quadrature-phase data at each carrier frequency as input vectors and to output an effective angle-of-propagation, and a relative delay and a relative attenuation of each channel, with respect to a selected reference channel, based on characteristics of the V-spirograph.

7. The system of claim 5, wherein the H-spirograph for a channel with no multipath reflections comprises a single point in the I/Q plane with a location determined by analog chain mismatches in a front end of the transceiver and a line of sight (LOS) angle-of-propagation of the channel.

8. The system of claim 5, wherein the H-spirograph for a channel with one multipath reflection comprises a circular arc in the I/Q plane having a center, a radius, and an arc span with uniformly spaced carrier frequency points, wherein:
the location of the center of the circular arc is determined by analog chain mismatches in a front end of the transceiver and a line of sight (LOS) angle-of-propagation;
the radius of the circular arc is determined by a magnitude of the multipath reflection relative to the LOS signal; and
the span of the circular arc is determined by a phase of the multipath reflection relative to the LOS signal and by the angle-of-propagation of the multipath reflection relative to the LOS signal.

9. The system of claim 8, wherein the H-spirographs for all channels with one multipath reflection are congruent under a rotation and a translation.

10. The system of claim 5, wherein the V-spirograph for a channel with no multipath reflections comprises a single point in the I/Q plane with a location determined by analog chain mismatches in a front end of the transceiver and a line of sight (LOS) angle-of-propagation.

11. The system of claim 5, wherein the V-spirograph for a channel with one multipath reflection comprises a circular arc in the I/Q plane having a center, a radius and an arc span with non-uniformly spaced carrier frequencies, wherein:
the location of the center of the circular arc, the radius of the circular arc, and the span of the circular arc determined by analog chain mismatches in a front end of the transceiver, a line of sight (LOS) angle-of-propagation of the channel, a magnitude of the multipath reflection relative to the LOS signal, a phase of the multipath reflection relative to the LOS signal and by the angle-of-propagation of the multi path reflection relative to the LOS signal.

12. The system of claim 11, wherein the V-spirographs for all channels with one multipath reflection, relative to the selected reference channel, are similar under a translation, a rotation and a radial scaling.

13. The system of claim 5, wherein the H-spirograph for a channel with two or more multipath reflections comprises a compound hypocycloid in the I/Q plane.

14. The system of claim 13, wherein the H-spirographs for all channels with two multipath reflections are congruent under one translation and one rotation.

15. The system of claim 5, wherein the V-spirograph for a channel with two multipath reflections comprises a non-symmetrical trace in the I/Q plane, and wherein the V-spirographs for all channels with two multipath reflections, relative to the selected reference channel, are similar under a scaling, a rotation and a resampling.

16. A method, comprising:
receiving, at a transceiver in a multi-carrier, multi antenna communication system, one of channel estimates and beamforming estimates for a plurality of carrier frequencies;
estimating, with a multi-layer perceptron feed forward neural network (FFNN), parameters of multi path reflections using representations of the channel estimates or beamforming feedback;

adjusting phases and amplitudes of channel transmissions based on the estimated parameters of multipath reflections; and extracting from the channel estimates, in a processor, frequency dependent n by m H-matrix amplitude and phase data for a plurality of carrier frequencies, or extracting from the beamforming feedback, frequency dependent n by m V-matrix amplitude and phase data for the plurality of carrier frequencies, wherein n is a number of transmit antennas, m is a number of receive antennas, and the product of m and n is a number of channels in the communication system, wherein m and n are natural numbers.

17. The method of claim 16, further comprising:

storing, in a memory coupled to the processor and the FFNN, weights, biases and activation functions for the FFNN, and storing the estimated parameters of multipath reflection.

18. The method of claim 17, further comprising converting, in the processor, the H-matrix data to a frequency dependent H-spirograph in an I/Q plane based on in-phase (I) and quadrature-phase (Q) components of the H-matrix data, or converting, in the processor, the V-matrix data to a frequency dependent V-spirograph in the I/Q plane based on in-phase (I) and quadrature-phase (Q) components of the V-matrix data.

19. The method of claim 18, further comprising:

receiving, at the FFNN, the H-spirograph in-phase and quadrature-phase data at each carrier frequency as input vectors and outputting an effective angle-of-propagation, effective channel attenuation, and effective channel delay of each channel based on characteristics of the H-spirograph; or receiving, at the FFNN, the V-spirograph in-phase and quadrature-phase data at each frequency as input vectors and outputting an effective angle-of-propagation and a relative delay and a relative attenuation of each channel, with respect to a selected reference channel, based on characteristics of the V-spirograph.

20. The method of claim 18, wherein the H-spirograph for a channel with no multipath reflections comprises a single point in the FQ plane with a location determined by analog chain mismatches in a front end of the transceiver and a line of sight (LOS) angle-of-propagation of the channel.

21. The method of claim 18, wherein the H-spirograph for a channel with one multipath reflection comprises a circular arc in the I/Q plane having a center, a radius, and an arc span with uniformly spaced carrier frequency points, wherein:

the location of the center of the circular arc is determined by analog chain mismatches in a front end of the transceiver and a line of sight (LOS) angle-of-propagation;

the radius of the circular arc is determined by a strength of the multipath reflection relative to the LOS signal; and the span of the circular arc is determined by a phase of the multipath reflection relative to the LOS signal and by the angle-of-propagation of the multipath reflection relative to the LOS signal.

22. The method of claim 21, wherein the H-spirographs for all channels with one multipath reflection are congruent under a rotation and a translation.

23. The method of claim 18, wherein the V-spirograph for a channel with no multipath reflections comprises a single point in the I/Q plane with a location determined by analog chain mismatches in a front end of the transceiver and a line of sight (LOS) angle-of-propagation.

24. The method of claim 18, wherein the V-spirograph for a channel with one multipath reflection comprises a circular arc in the I/Q plane having a center, a radius and an arc span with non-uniformly spaced carrier frequencies, wherein:

the location of the center of the circular arc, the radius of the circular arc, and the span of the circular arc determined by analog chain mismatches in a front end of the transceiver, a line of sight (LOS) angle-of-propagation of the channel, a strength of the multipath reflection relative to the LOS signal, a phase of the multipath reflection relative to the LOS signal and by the angle-of-propagation of the multipath reflection relative to the LOS signal.

25. The method of claim 24 wherein the V-spirographs for all channels with one multipath reflection, relative to the selected reference channel, are similar under a translation, a rotation and a radial scaling.

26. The method of claim 18, wherein the H-spirograph for a channel with two multipath reflections comprises a compound hypocycloid in the I/Q plane.

27. The method of claim 26, wherein the H-matrix spirographs for all channels with two multipath reflections are congruent under one translation and one rotation.

28. The method of claim 18, wherein the V-spirograph for a channel with two multipath reflections comprises a non-symmetrical trace in the I/Q plane, and wherein the V-spirographs for all channels with two multipath reflections, relative to the selected reference channel, are similar under a scaling, a rotation and a resampling.

29. A method, comprising:

providing training data comprising simulations of channel estimates and beamforming feedback in a multi-channel, multi-carrier communication system for a plurality of multipath scenarios;

training a multi-layer perceptron feed forward neural network (FFNN) with in-phase and quadrature-phase representations of the channel estimates and beamforming feedback, to estimate parameters of multipath reflections;

generating spirographic feature sets from the in-phase and quadrature representations of the channel estimates and beamforming feedback for each of the plurality of multipath scenarios, for each channel at each carrier frequency; and storing weights, biases and activation functions of the trained FFNN in a memory.

30. The method of claim 29 wherein training the FFNN comprises:

applying the feature sets in batches to the FFNN in a forward pass to generate a loss function comprising a representation of the training data; and propagating the loss function in a backward pass through the FFNN to update weights and biases of the FFNN to minimize the loss function.

\* \* \* \* \*